US010860844B2

(12) United States Patent
Tang et al.

(10) Patent No.: US 10,860,844 B2
(45) Date of Patent: Dec. 8, 2020

(54) RECOGNITION OF ACTIVITY IN A VIDEO IMAGE SEQUENCE USING DEPTH INFORMATION

(71) Applicant: INTEL CORPORATION, Santa Clara, CA (US)

(72) Inventors: Shaopeng Tang, Beijing (CN); Anbang Yao, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 16/098,648

(22) PCT Filed: Jun. 2, 2016

(86) PCT No.: PCT/CN2016/084536
§ 371 (c)(1),
(2) Date: Nov. 2, 2018

(87) PCT Pub. No.: WO2017/206147
PCT Pub. Date: Dec. 7, 2017

(65) Prior Publication Data
US 2019/0147235 A1 May 16, 2019

(51) Int. Cl.
*G06K 9/00* (2006.01)
*G06K 9/46* (2006.01)
(Continued)

(52) U.S. Cl.
CPC ..... *G06K 9/00355* (2013.01); *G06K 9/00201* (2013.01); *G06K 9/00342* (2013.01);
(Continued)

(58) Field of Classification Search
CPC ........... G06K 9/00355; G06K 9/00201; G06K 9/00342; G06K 9/00771; G06K 9/4642;
(Continued)

(56) References Cited

U.S. PATENT DOCUMENTS

2006/0088191 A1\* 4/2006 Zhang ................ G06T 7/246
382/107
2010/0034427 A1\* 2/2010 Fujimura ........... G06K 9/00845
382/106
2010/0194741 A1 8/2010 Finocchio

FOREIGN PATENT DOCUMENTS

| CN | 104268520 | 1/2015 |
| CN | 105590096 | 5/2016 |
| WO | 2017206147 | 12/2017 |

OTHER PUBLICATIONS

Oreifej et al., "HON4D: Histogram of Oriented 4D Normals for Activity Recognition from Depth Sequences", In Computer Vision and Pattern Recognition (CVPR), 2013 IEEE Conference on, pp. 716-723 (2013).

(Continued)

*Primary Examiner* — Leon Flores
(74) *Attorney, Agent, or Firm* — Finch & Maloney PLLC

(57) ABSTRACT

Techniques are provided for recognition of activity in a sequence of video image frames that include depth information. A methodology embodying the techniques includes segmenting each of the received image frames into a multiple windows and generating spatio-temporal image cells from groupings of windows from a selected sub-sequence of the frames. The method also includes calculating a four dimensional (4D) optical flow vector for each of the pixels of each of the image cells and calculating a three dimensional (3D) angular representation from each of the optical flow vectors. The method further includes generating a classification feature for each of the image cells based on a histogram of the 3D angular representations of the pixels in that image cell. The classification features are then provided to a recognition classifier configured to recognize the type of activity depicted in the video sequence, based on the generated classification features.

20 Claims, 10 Drawing Sheets

(51) Int. Cl.
  G06K 9/62    (2006.01)
  G06T 7/215   (2017.01)
  G06T 7/579   (2017.01)
  G06T 7/593   (2017.01)
(52) U.S. Cl.
  CPC ....... G06K 9/00771 (2013.01); G06K 9/4642 (2013.01); G06K 9/6269 (2013.01); G06T 7/215 (2017.01); G06T 7/579 (2017.01); G06T 7/596 (2017.01); *G06T 2207/20081* (2013.01); *G06T 2207/20132* (2013.01)
(58) Field of Classification Search
  CPC ....... G06K 9/6269; G06T 7/215; G06T 7/579; G06T 7/596
  See application file for complete search history.

(56) References Cited

OTHER PUBLICATIONS

Yang et al., "Super Normal Vector for Activity Recognition Using Depth Sequences", In Computer Vision and Pattern Recognition (CVPR), 2014 IEEE Conference on, 8 pages (2014).

Li et al., "Action Recognition Based on a Bag of 3D Points", In Computer Vision and Pattern Recognition Workshops (CVPRW), 2010 IEEE Computer Society Conference on, pp. 9-14 (2010).

Vemulapalli et al., "Human Action Recognition by Representing 3D Skeletons as Points in a Lie Group", In Computer Vision and Pattern Recognition (CVPR), 2014 IEEE Conference on, 8 pages (2014).

Xia et al., "Spatio-Temporal Depth Cuboid Similarity Feature for Activity Recognition Using Depth Camera", In Computer Vision and Pattern Recognition (CVPR), 2013 IEEE Conference on, 8 pages (2013).

Wang et al., "An approach to pose-based action recognition", In Computer Vision and Pattern Recognition (CVPR), 2013 IEEE Conference on, pp. 915-922 (2013).

Zanfir et al., "The Moving Pose: An Efficient 3D Kinematics Descriptor for Low-Latency Action Recognition and Detection", In Computer Vision (ICCV), 2013 IEEE International Conference on, pp. 2752-2759 (2013).

Bruhn et al., "Real-Time Optic Flow Computation with Variational Methods", In Computer Analysis of Images and Patterns, Springer Berlin Heidelberg, pp. 222-229, (2003).

Wang et al., "Mining Actionlet Ensemble for Action Recognition with Depth Cameras" In Computer Vision and Pattern Recognition (CVPR), 2012 IEEE Conference on, 8 pages (2012).

Bruhn et al., "Combining the Advantages of Local and Global Optic Flow Methods", In Pattern Recognition, vol. 2449 of Lecture Notes in Computer Science, Springer Berlin, pp. 454-462 (2002).

Yang et al., "Recognizing Actions Using Depth Motion Maps-based Histograms of Oriented Gradients", In Proceedings of the 20th ACM international conference on Multimedia, 4 pages (2012).

Dalal et al., "Histograms of Oriented Gradients for Human Detection", In Computer Vision and Pattern Recognition, CVPR 2005, IEEE Computer Society Conference on, 8 pages (2005).

Jia et al., "Latent Tensor Transfer Learning for RGB-D Action Recognition", In ACM Multimedia, 10 pages (2014).

International Search Report International Patent Application No. PCT/CN2016/084536, dated Feb. 17, 2017, 4 pages.

Written Opinion of the International Searching Authority International Patent Application No. PCT/CN2016/084536, dated Feb. 17, 2017, 4 pages.

International Preliminary Report on Patentability for International Patent Application No. PCT/CN2016/084536, dated Dec. 13, 2018, 5 pages.

\* cited by examiner

Drawing Activity
202

Playing Tennis
204

Depth Images
606

2D Optical Flow Vectors
608

Frame 1
602

Frame N
604

RECOGNITION OF ACTIVITY IN A VIDEO IMAGE SEQUENCE USING DEPTH INFORMATION

BACKGROUND

The capability to recognize a type of activity depicted in an image sequence or video is often useful, for example in surveillance applications, robotic applications, video games, or as a preliminary operation in a more complex image processing system. Unfortunately, automated activity recognition is a relatively difficult computational problem due to variations in lighting, background clutter, subject pose, viewing angle, etc. Existing methods, which often employ dictionary learning or clustering methods, tend to be computationally expensive, requiring lengthy classifier training and/or relatively fast processors. Even so, these methods tend not to be robust, resulting in activity recognition accuracy that may be unacceptable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for recognition of human action or other types of activity in image frame sequences or videos that include depth information. Such images may be generated, for example, by a depth camera that provides both color (red-green-blue or RGB) pixels and depth pixels. Such images may be referred to as RGB-D images. The techniques described herein may recognize and classify different types of activity, such as particular sporting activities or performance of tasks, etc. The recognition is based on motion-based discriminative features that distinguish different types of actions. Such motion information is used to model the characteristics of the action depicted in the image frames and multi-dimensional optical flow vectors are used to describe that motion at the level of each pixel, as will be explained in greater detail below.

In accordance with an embodiment, techniques for activity recognition may include receiving a sequence of depth image frames depicting the performance of some activity. The collection of image frames are divided up into a number of spatio-temporal image cells. Each cell includes a grouping of spatial regions from consecutive frames. Four dimensional (4D) optical flow vectors are then calculated for each pixel in each of the cells, and the 4D optical flow vectors are converted to a three dimensional (3D) angular representation, as will be explained below. A histogram is generated for each cell to accumulate the magnitudes of the pixels in that cell into bins associated with different angular ranges based on the calculated angular representation of each pixel. The resulting histograms from each cell are used as features for an activity recognition classifier.

The techniques described herein may allow for reduced computational overhead, including more efficient classifier training and operation, compared to existing methods, given the direct calculation of features from optical flow eliminating the need for traditional dictionary learning or clustering methods. Additionally, these techniques do not require special camera calibration procedures and can be implemented in any desired platform including, for example, a mobile device such as a tablet or smartphone that includes a depth camera or can receive images from a depth camera. These techniques may further be implemented in hardware or software or a combination thereof.

Figure 1:
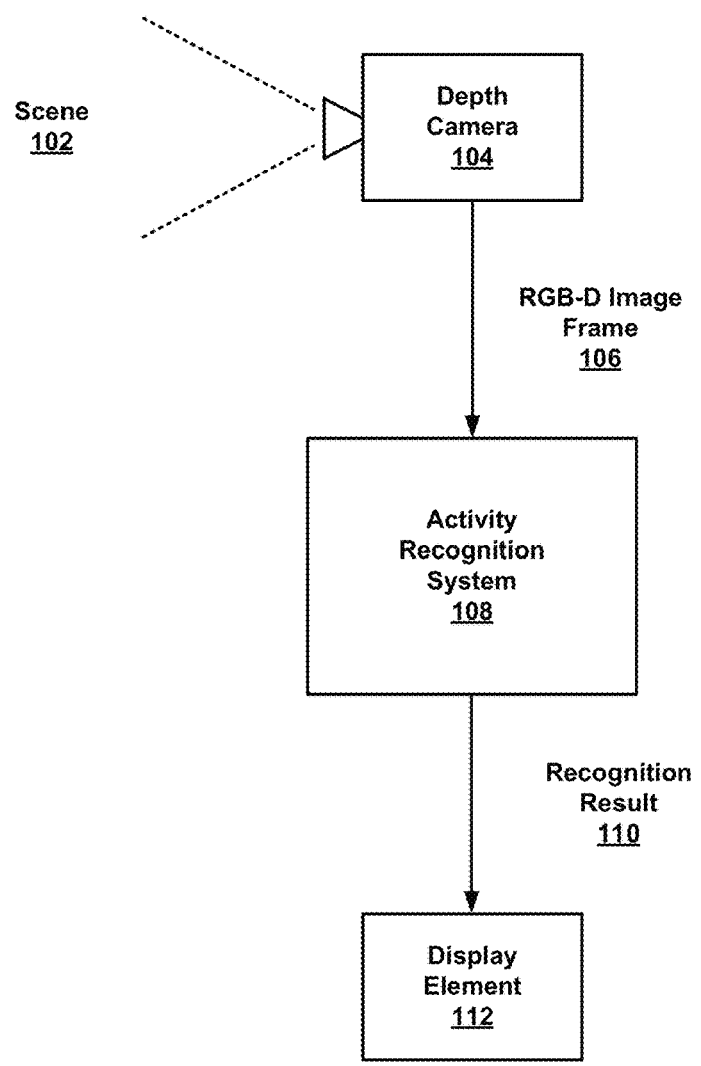
FIG. 1 is a top level block diagram of an implementation of an activity recognition system, configured in accordance with certain of the embodiments disclosed herein.

FIG. 1 is a top level block diagram 100 of an implementation of an activity recognition system, configured in accordance with certain of the embodiments disclosed herein. A depth camera 104 is configured to generate a sequence of RGB-D image frames 106 of a scene 102. The sequence of frames provides a temporal representation of the scene and may be referred to herein as a video sequence. The scene may encompass any subject matter and may depict humans (or other subjects) performing some type of activity such as, for example, performing a task or playing a sport. One or more RGB-D image frames 106 are provided to the activity recognition system 108, the operations of which will be described in greater detail below, and recognition results 110 are generated. The recognition results may be presented to a user or operator of the system through a display element 112 or other suitable mechanism.

Figure 2:
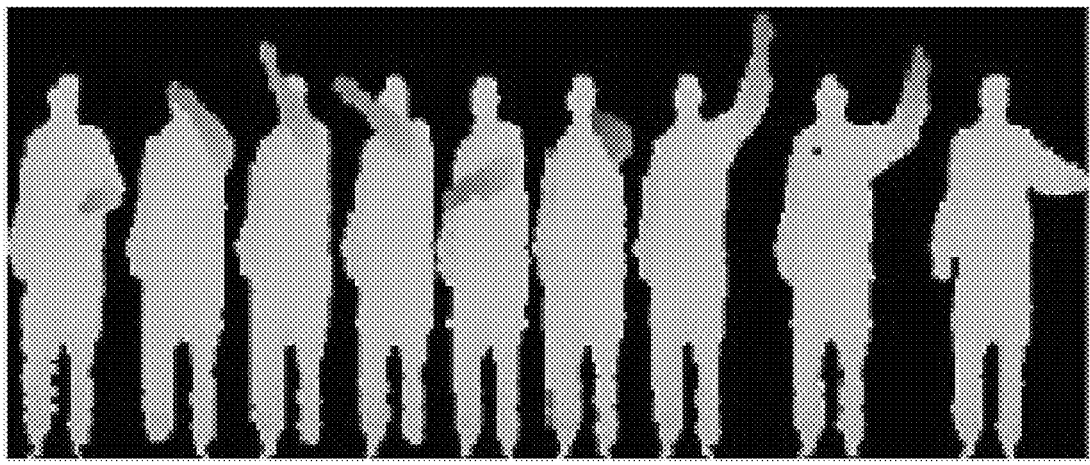
FIG. 2 illustrates examples of depth image frame sequences of human activities, in accordance with certain of the embodiments disclosed herein.
Figure 2:
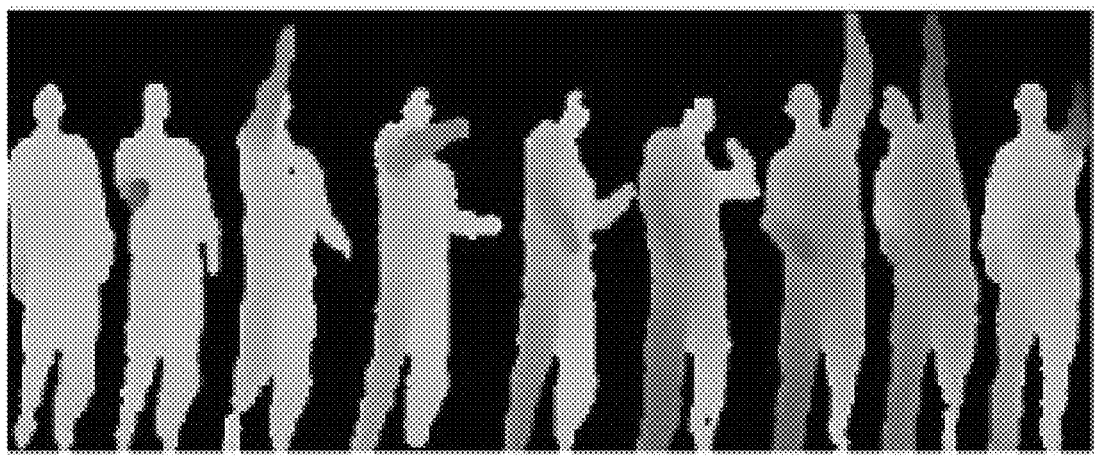

FIG. 2 illustrates examples of depth image frame sequences of human activities, in accordance with certain of the embodiments disclosed herein. In the top illustration 202, a sequence of depth image frames (from left to right) depicts a human performing a drawing activity, for example drawing on a blackboard with a marker. In the bottom illustration 204, the sequence of depth image frames (again from left to right) depicts a human playing tennis, for example serving the tennis ball.

Figure 3:
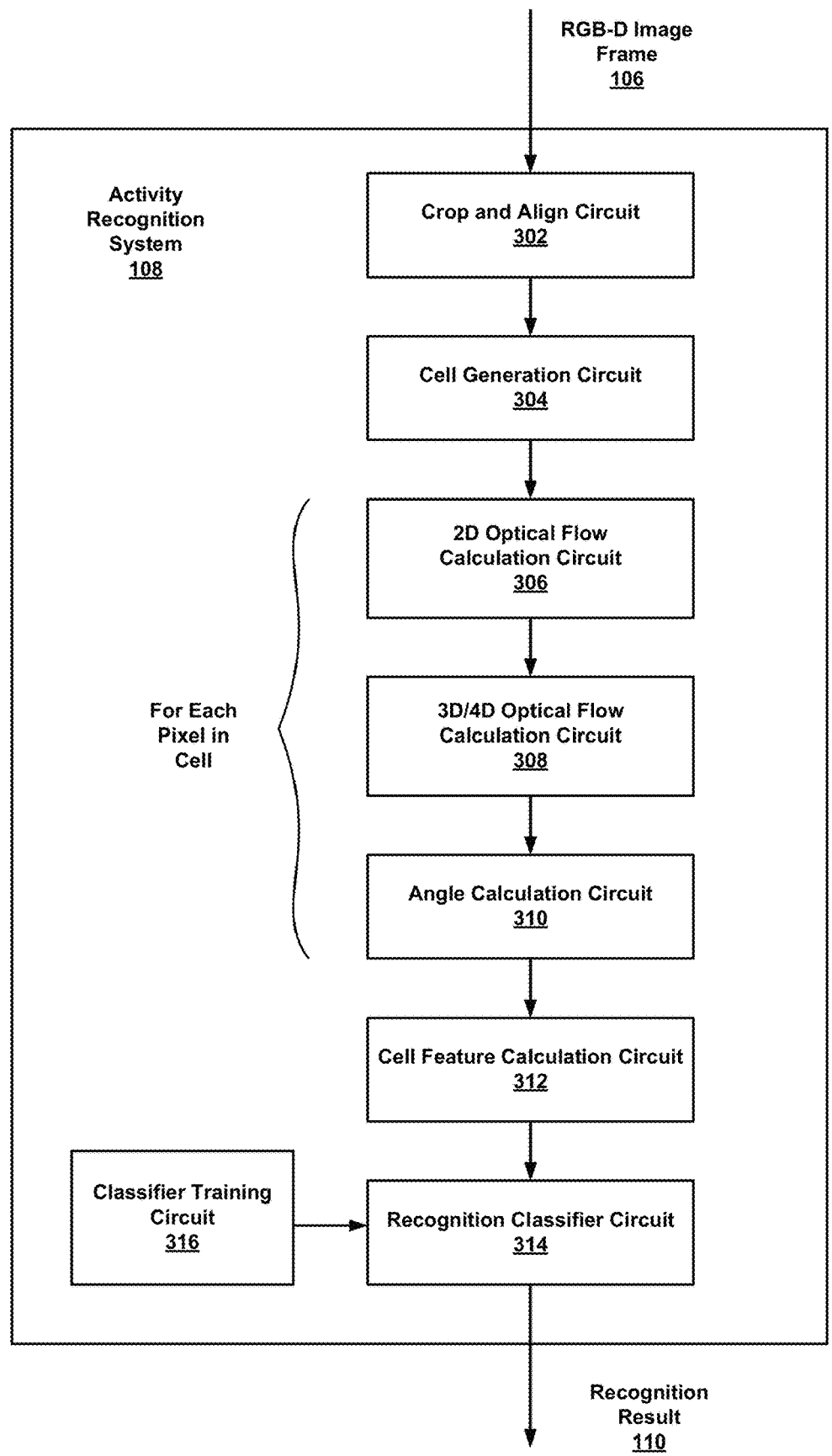
FIG. 3 is a more detailed block diagram of an activity recognition system, configured in accordance with certain of the embodiments disclosed herein.

FIG. 3 is a more detailed block diagram of an activity recognition system 108, configured in accordance with certain of the embodiments disclosed herein. The activity recognition system 108 is shown to include a crop and align circuit 302, a cell generation circuit 304, a two dimensional (2D) optical flow calculation circuit 306, a three and four dimensional (3D/4D) optical flow calculation circuit 308, an angle calculation circuit 310, a cell feature calculation circuit 312, a recognition classifier circuit 314, and a classifier training circuit 316.

Figure 4:
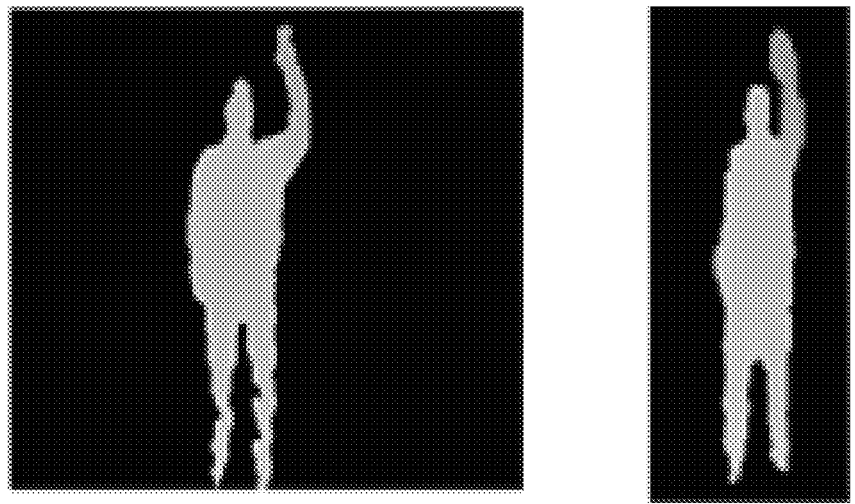
FIG. 4 illustrates image frame cropping, in accordance with certain of the embodiments disclosed herein.

A sequence of depth image frames may be provided by a depth camera or other source. The frames include both color (e.g., RGB) pixels and depth pixels. The crop and align circuit 302 may be configured to detect a subject of interest in each of the received RGB-D frames and to crop those frames around the subject to eliminate background scenery that is not relevant to the activity. The subject of interest may be detected using known techniques, in light of the present disclosure. A cropping operation is illustrated, for example, in FIG. 4 where the received frame 402 is shown next to the cropped frame 404. In some embodiments, the crop and align circuit 302 may also be configured to spatially align each of the cropped frames relative to one another to facilitate their grouping by the cell generation circuit as described below.

Figure 5:
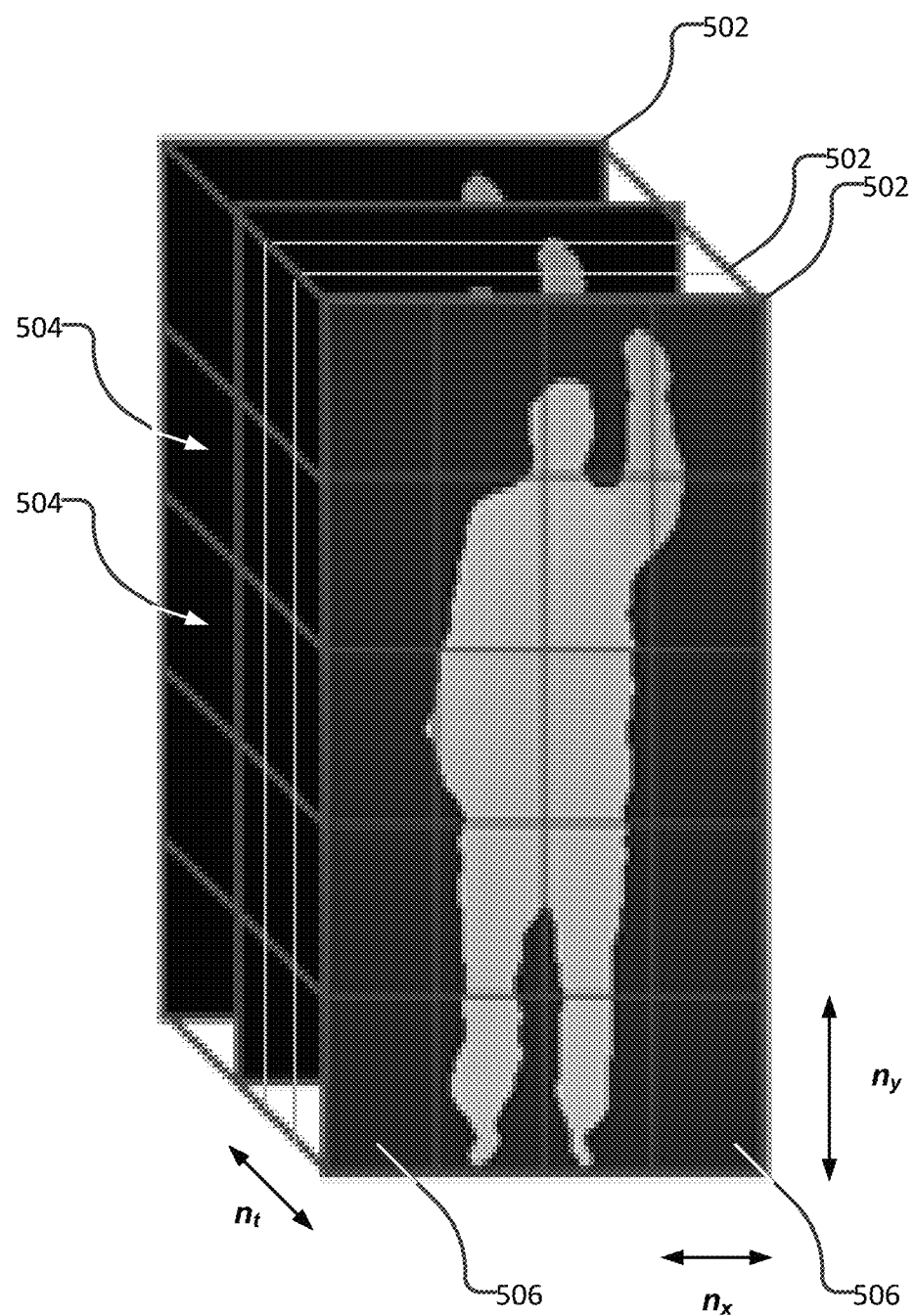
FIG. 5 illustrates image cells, in accordance with certain of the embodiments disclosed herein.

The cell generation circuit 304 may be configured to generate spatio-temporal image cells, also referred to as image cubes, from the sequence of cropped image frames. This is illustrated in FIG. 5, where a series of image frames 502 are shown in a stacked formation, one behind the other. This series represents a time sequence of image frames. Each frame is spatially segmented into a number of windows 506 of a selected size, for example $n_x$ columns of pixels by $n_y$ rows of pixels.

Spatio-temporal image cells 504 are generated by grouping a number, $n_1$, of windows 506, from consecutive frames 502 into a cell. Thus, a cell comprises a selected sub-sequence of windows of consecutive frames. Each window of that group represents a consecutive temporal snapshot of the same (or similar) spatial region. The resulting spatio-temporal image cube may thus include $n_x$ columns of pixels by $n_y$ rows of pixels by $n_1$ frames.

Figure 6:
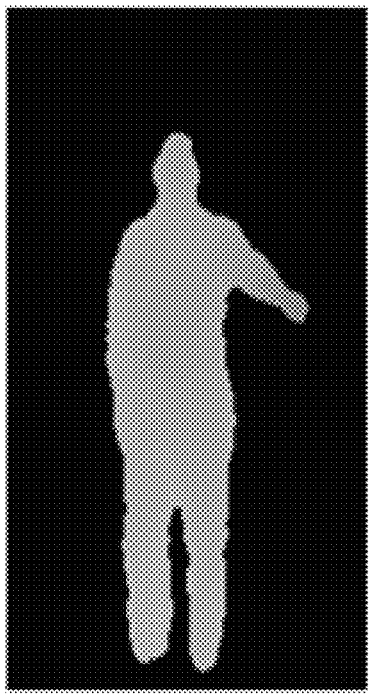
FIG. 6 illustrates 2D optical flow vectors, in accordance with certain of the embodiments disclosed herein.
Figure 6:
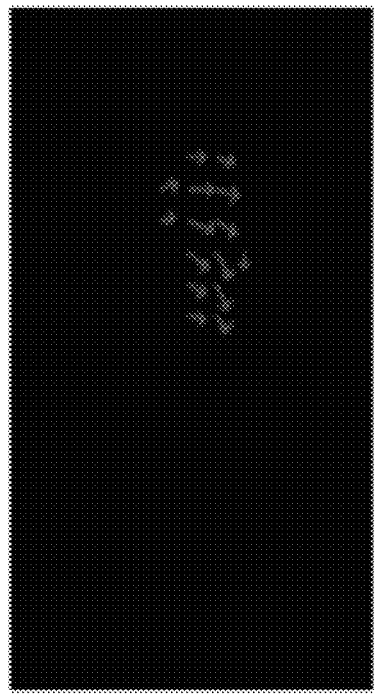
Figure 6:
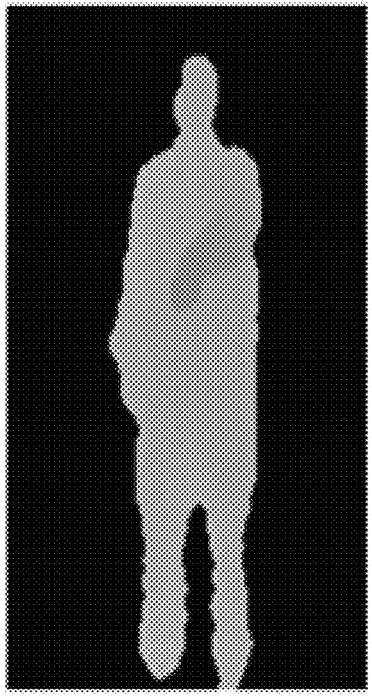
Figure 6:
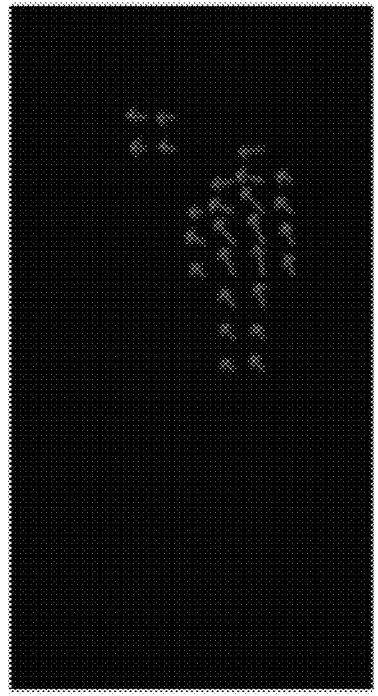

The two dimensional (2D) optical flow calculation circuit 306 may be configured to calculate a 2D optical flow vector (u,v) for each pixel in the image cell 504. The vector represents the 2D motion or displacement of a pixel (in the x,y direction or plane of the frame window) between one frame and the next frame. This is illustrated, for example in FIG. 6, which shows two frames at different times: frame 1 602 in the top row and frame N 604 in the bottom row. For each frame there is shown a depth image 606 on the left and corresponding 2D optical flow vectors 608 on the right. The vectors, depicted as red arrows, represent the estimated displacement of pixels between that frame and the next consecutive frame (e.g., between frames 1 and 2 on the top, and between frames N and N+1 on the bottom).

The 2D vector calculation is based on a combined local-global energy minimization function applied to the pixels of the image cell. In some embodiments, the energy minimization function employs a combination of the global Horn-Schunck technique and the local Lucas-Kanade technique. Additionally, to improve calculation efficiency of the minimization function, the Bruhn multi-grid technique may be employed, using a fine-to-coarse hierarchy. In some embodiments, other known techniques may be employed, in light of the present disclosure.

The three and four dimensional (3D/4D) optical flow calculation circuit 308 may be configured to add a third dimension (q) to the 2D optical flow vector, based on a calculated displacement between corresponding pixels in consecutive frames, to generate a 3D vector (u,v,q). The third dimension (q component) encodes motion along the depth axis which may improve recognition accuracy, particularly with activities that involve motion along that axis. For example, the sport of boxing may include significant motion along the depth axis, in contrast to writing on a white board which may be more limited to motion in the x,y plane. Displacement along the depth axis may be defined and calculated as:

$$q(x, y, t) = f(x + u, y + v, t + 1) - f(x, y, t)$$

where f represents the pixel in a frame of the specified position (x,y) and time (t).

Figure 7:
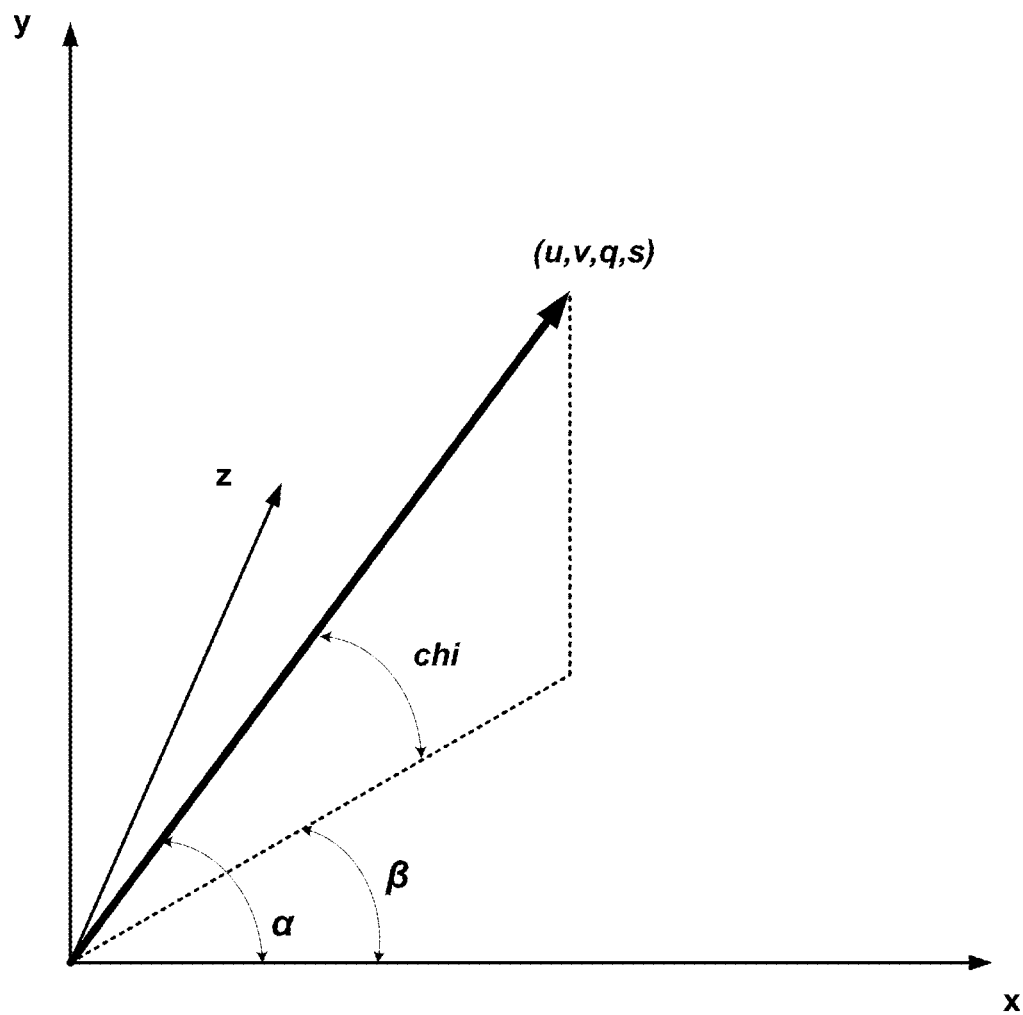
FIG. 7 illustrates an angular representation of a 4D optical flow vector, in accordance with certain of the embodiments disclosed herein.

The 3D/4D optical flow calculation circuit 308 may further be configured to add a fourth dimension (s) or magnitude component to the optical flow vector, to generate a 4D vector (u,v,q,s). The value of s may be a pre-determined scalar value, which in some embodiments may be set to 1. The 4D optical flow vector (u,v,q,s) is illustrated in FIG. 7 where the u component is along the x-axis, the v component is along the y-axis, the q component is along the z-axis (representing time from one frame to the next), and the s component is the magnitude of the vector.

The angle calculation circuit 310 may be configured to calculate a three dimensional (3D) angular representation for each of the 4D optical flow vectors in the image cell. The components of these angular representations ($\alpha$, $\beta$, chi) are also illustrated in FIG. 7 and may be calculated as follows:

$$\alpha = \arctan(v/u)$$

$$\beta = \arctan\left(\frac{\sqrt{u^2 + v^2}}{q}\right)$$

$$chi = \arctan\left(\frac{\sqrt{u^2 + v^2 + q^2}}{s}\right)$$

Figure 8:
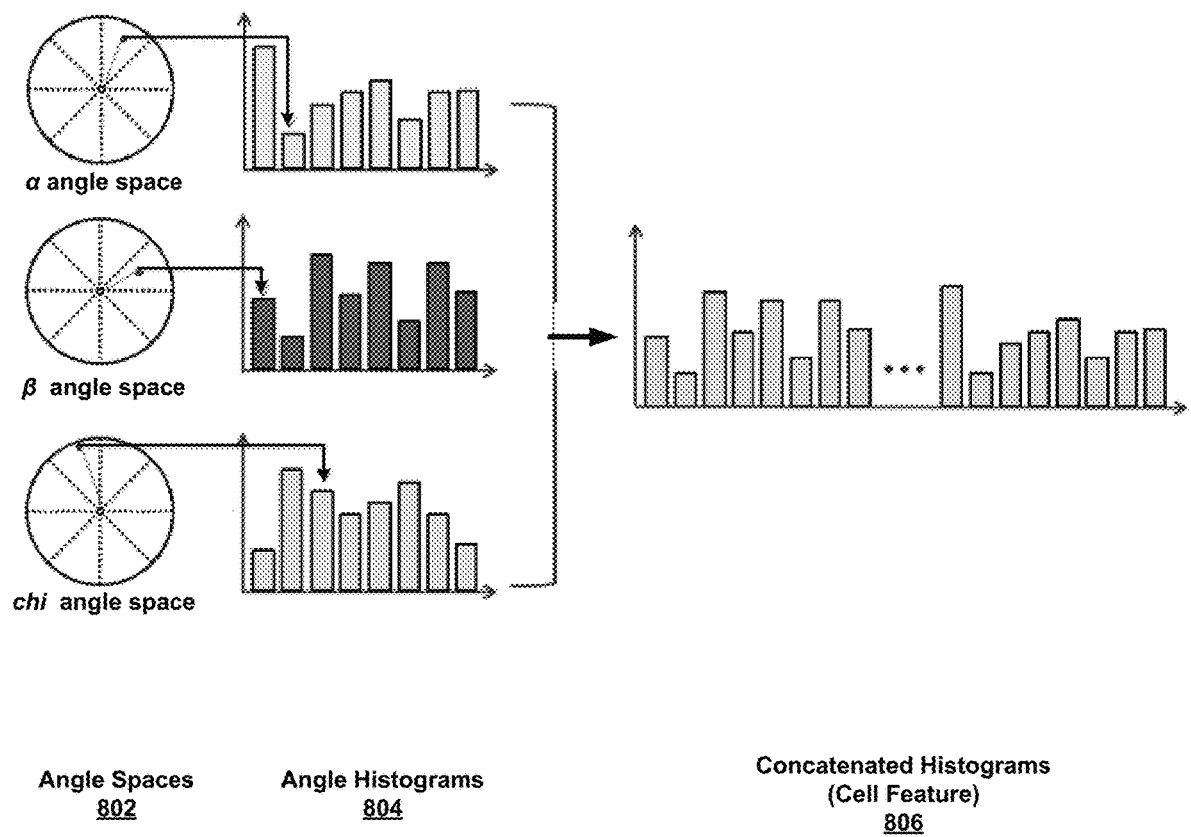
FIG. 8 illustrates histogram-based feature generation, in accordance with certain of the embodiments disclosed herein.

The cell feature calculation circuit 312 may be configured to generate a classification feature for each of the image cells based on histograms of the 3D angular representations ($\alpha$, $\beta$, chi) of the pixels in that cell. As illustrated in FIG. 8, each angular representation, or angle space 802 is divided into angular ranges. In this example there are 8 equally divided regions representing ranges of (0, $\pi/4$), ($\pi/4$, $\pi/2$), . . . (1.75 $\pi$, $2\pi$), although other divisions are possible.

A histogram 804 is associated with each dimension ($\alpha$, $\beta$, chi) of the 3D angular representation. The histograms comprise bins corresponding to each of the angular ranges. For each pixel in the image cell, that pixel's $\alpha$ component selects a bin from the cell's $\alpha$ histogram and that bin is incremented by the magnitude of that pixel. Similarly, for that pixel's, $\beta$ and chi components, a bin is selected from that cell's the $\beta$ and chi histograms which are incremented by the magnitude of the pixel. In this manner, all (or most) of the pixels in a given image cell contribute to the three histograms of that image cell.

The cell feature calculation circuit 312 may be further configured to normalize the three histograms and concatenate them into one larger histogram 806. In some embodiments, the normalization process may include scaling each histogram by a selected scale factor to adjust the values into a desired range. The concatenated histogram 806 may then serve as the classification feature for that image cell.

In some embodiments, the number of histogram bins may be in the range of 5 to 9 bins. In some embodiments, the α angle space may be divided into 7 bins, the β angle space maybe divided into 9 bins and the chi angle space may be divided into 6 bins.

The recognition classifier circuit 314 may be configured to recognize an activity in the sequence of depth image frames based on the classification features generated for each image cell. In some embodiments, the recognition classifier circuit may be a Support Vector Machine (SVM) classifier. In some embodiments, other known classifier techniques may be employed, in light of the present disclosure.

The classifier training circuit 316 may be configured to train the recognition classifier 314. Training videos may be provided for this purpose, the training videos comprising a sequence of depth image frames depicting a known activity, such as playing a particular sport or performing some task. Image cells may be generated from the training video frames, as described above in connection with the operation of the recognition system. Classification features may then be generated for each of the image cells of the training frames, also as described above. These classification features are then provided to the recognition classifier, along with a label associated with the known activity, to train the recognition classifier.

Methodology

Figure 9:
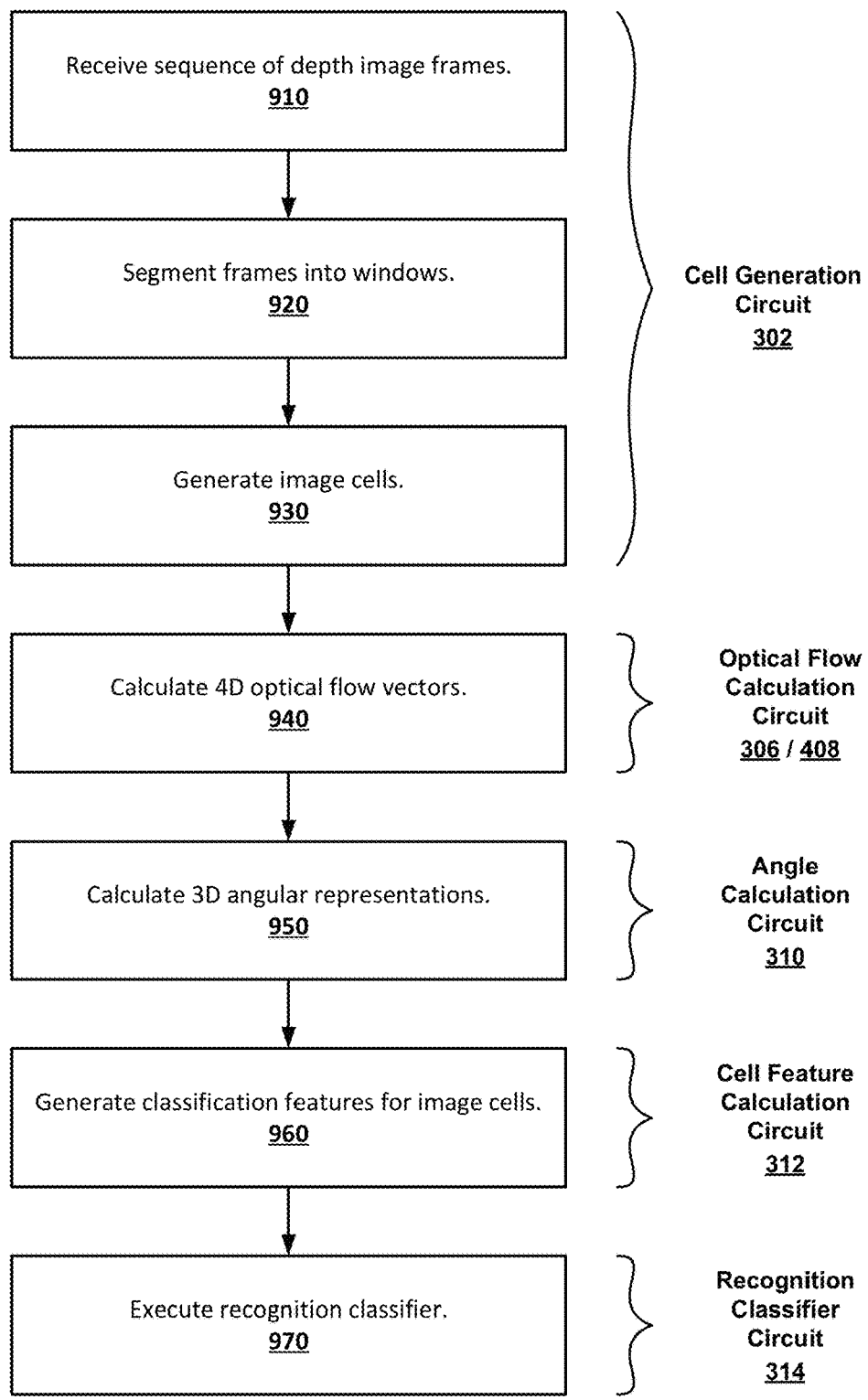
FIG. 9 is a flowchart illustrating a methodology for activity recognition in depth images, in accordance with certain of the embodiments disclosed herein.

FIG. 9 is a flowchart illustrating an example method 900 for recognition of activity in a sequence of depth image frames, in accordance with an embodiment of the present disclosure. As can be seen, example method 900 includes a number of phases and sub-processes, the sequence of which may vary from one embodiment to another. However, when considered in the aggregate, these phases and sub-processes form a process for detection of humans in accordance with certain of the embodiments disclosed herein. These embodiments can be implemented, for example using the system architecture illustrated in FIG. 3 as described above. However other system architectures can be used in other embodiments, as will be apparent in light of this disclosure. To this end, the correlation of the various functions shown in FIG. 9 to the specific components illustrated in FIG. 3 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for recognition of activity commences by receiving, at operation 910, a sequence of depth image frames. The image frames may be provided by a depth camera and include both color (e.g., RGB) pixels and depth pixels. At operation 920, the frames are spatially segmented into a number of windows of a selected size, for example $n_x$ columns of pixels by $n_y$ rows of pixels.

Next, at operation 930, a number of spatio-temporal image cells are generated by grouping or stacking windows of a selected sub-sequence of consecutive frames. Each window represents a consecutive temporal snapshot of the same or similar spatial region. The resulting spatio-temporal image cube may include, for example, $n_x$ columns of pixels by $n_y$ rows of pixels by $n_t$ frames.

At operation 940, a 4D optical flow vector (u,v,q,s) is calculated for each of the pixels of each of the image cells. In some embodiments, this is accomplished by first calculating a 2D optical flow vector (u,v) for each pixel using a combined local-global energy minimization function applied to the pixels. Then a third dimension q is added to the 2D vector based on a calculated difference between corresponding pixels in consecutive frames of the image cell to create a 3D vector. A pre-determined scalar value s may then be added to the 3D vector to generate the 4D optical flow vector.

At operation 950, a 3D angular representation (alpha, beta, chi) is calculated from each of the 4D optical flow vectors and, at operation 960, a classification feature is generated for each image cell based on the angular representation of the pixels in that cell. In some embodiments, the classification feature is generated by building a histogram for each of the angular dimensions (alpha, beta, chi), wherein the bins of the histogram are associated with angular ranges. Each bin for each dimension is incremented by the magnitude of a pixel that has an angular representation, for that dimension, which falls within the range of that bin.

At operation 970, a recognition classifier is executed to recognize an activity depicted in the image frames based on the generated classification features. In some embodiments, the recognition classifier is a Support Vector Machine (SVM) classifier.

Of course, in some embodiments, additional operations may be performed, as previously described in connection with the system. These additional operations may include, for example, detecting a subject of interest in the each of the image frames and cropping those flames around the subject to eliminate unnecessary background scenery. The cropped image frames may also be aligned relative to one another to facilitate their grouping or stacking to generate the image cells.

Example System

Figure 10:
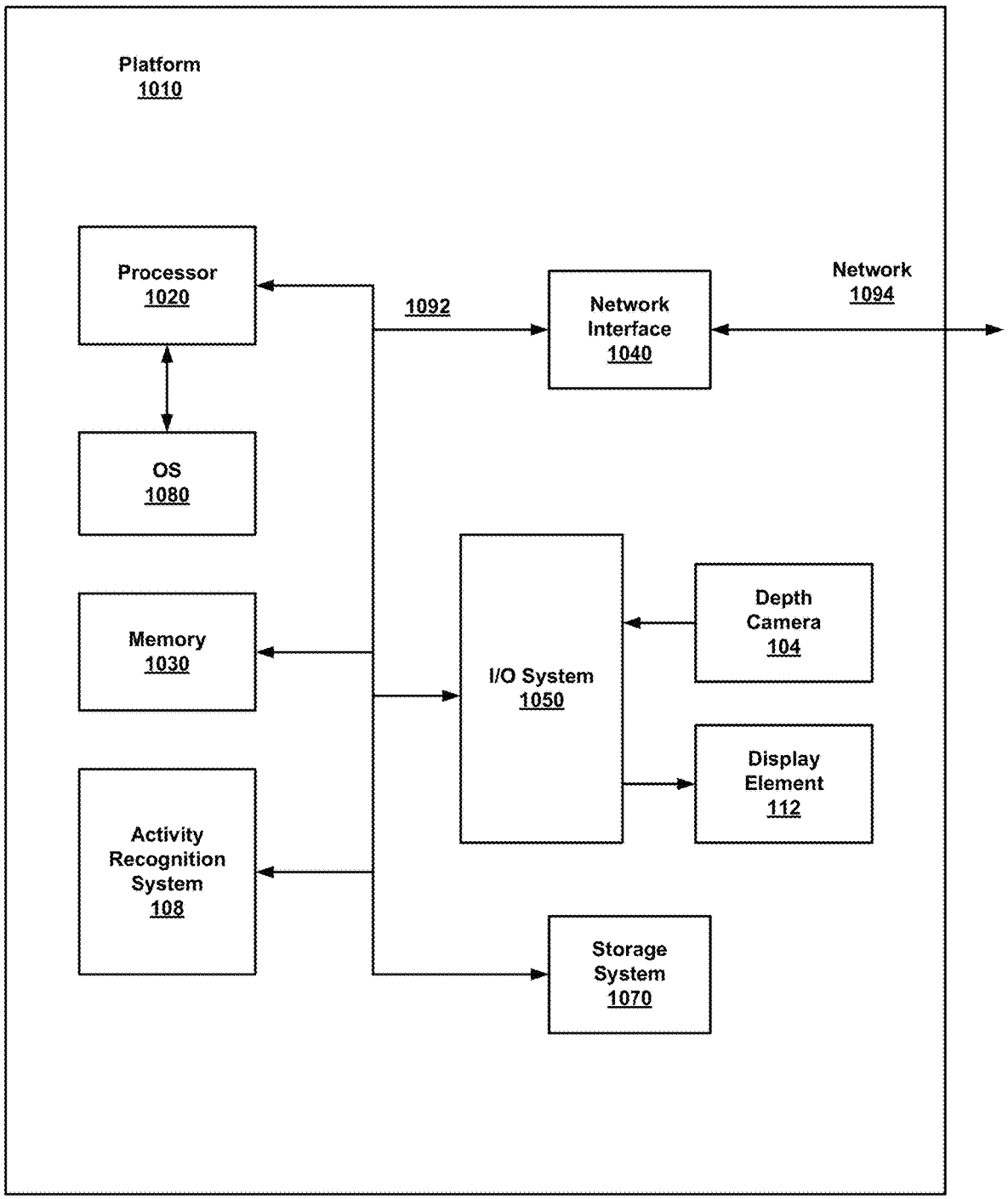
FIG. 10 is a block diagram schematically illustrating a system platform configured to perform activity recognition, in accordance with certain of the embodiments disclosed herein.

FIG. 10 illustrates an example system 1000 configured to recognize activity in a sequence of image frames that include depth information, as described herein. In some embodiments, system 1000 comprises a platform 1010 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 1010 may comprise any combination of a processor 1020, a memory 1030, activity recognition system 108, a network interface 1040, an input/output (I/O) system 1050, a depth camera 104, a display element 112 and a storage system 1070. As can be further seen, a bus and/or interconnect 1092 is also provided to allow for communication between the various components listed above and/or other components not shown. Platform 1010 can be coupled to a network 1094 through network interface 1040 to allow for communications with other computing devices, platforms or resources. Other componentry and functionality not reflected in the block diagram of FIG. 10 will be apparent in light of this disclosure, and it will be appreciated that other embodiments are not limited to any particular hardware configuration.

Processor 1020 can be any suitable processor, and may include one or more coprocessors or controllers, such as an audio processor or a graphics processing unit, to assist in control and processing operations associated with system 1000. In some embodiments, the processor 1020 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1020 may be implemented as a complex instruction set computer (CISC) or a reduced instruction set computer (RISC) processor. In some embodiments, processor 1020 may be configured as an x86 instruction set compatible processor.

Memory 1030 can be implemented using any suitable type of digital storage including, for example, flash memory and/or random access memory (RAM). In some embodiments, the memory 1030 may include various layers of memory hierarchy and/or memory caches as are known to those of skill in the art. Memory 1030 may be implemented as a volatile memory device such as, but not limited to, a RAM, dynamic RAM (DRAM), or static RAM (SRAM) device. Storage system 1070 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1070 may comprise technology to increase the storage performance enhanced protection for valuable digital media when multiple hard drives are included.

Processor 1020 may be configured to execute an Operating System (OS) 1080 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 1000, and therefore may also be implemented using any suitable existing or subsequently-developed platform.

Network interface circuit 1040 can be any appropriate network chip or chipset which allows for wired and/or wireless connection between other components of computer system 1000 and/or network 1094, thereby enabling system 1000 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1050 may be configured to interface between various I/O devices and other components of computer system 1000. I/O devices may include, but not be limited to, a depth camera 104, a display element 112, and other devices not shown such as a keyboard, mouse, microphone, speaker, etc.

I/O system 1050 may include a graphics subsystem configured to perform processing of images for display element 112. Graphics subsystem may be a graphics processing unit or a visual processing unit (VPU), for example. An analog or digital interface may be used to communicatively couple graphics subsystem and display element 112. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1020 or any chipset of platform 1010. In some embodiments, display element 112 may comprise any television type monitor or display. Display element 112 may comprise, for example, a computer display screen, touchscreen display, video monitor, television-like device, and/or a television. Display element 112 may be digital and/or analog. Under the control of the OS 1080 (or one or more software applications), platform 1010 may display images and detection results on display element 112. The images may be provided by depth camera 104 and the detection results may be provided by activity recognition system 108, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Activity recognition system 108 is configured to recognize a type of activity depicted in the provided sequence of depth image frames. The images may be provided by depth camera 104. Activity recognition system 108 may include any or all of the components illustrated in FIG. 3 and described above. Activity recognition system 108 can be implemented or otherwise used in conjunction with a variety of suitable software and/or hardware that is coupled to or that otherwise forms a part of platform 1010. System 108 can additionally or alternatively be implemented or otherwise used in conjunction with user I/O devices that are capable of providing information to, and receiving information and commands from, a user. These I/O devices may include display element 112, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, activity recognition system 108 may be installed local to system 1000, as shown in the example embodiment of FIG. 10. Alternatively, system 1000 can be implemented in a client-server arrangement wherein at least some functionality associated with these circuits is provided to system 1000 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 1094 or remotely coupled to network 1094 by one or more other networks and/or communication channels. In some cases access to resources on a given network or computing system may require credentials such as usernames, passwords, and/or compliance with any other suitable security mechanism.

In various embodiments, system 1000 may be implemented as a wireless system, a wired system, or a combination of both. When implemented as a wireless system, system 1000 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 1000 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the activity recognition methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1094. In other embodiments the functionalities disclosed herein can be incorporated into other software applications, such as video editing applications, video analysis applications, video surveillance applications, or other content generation, modification, and/or management applications. The computer software applications disclosed herein may include any number of different modules, submodules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1000 may comprise additional, fewer, or alternative subcomponents as compared to those included in the example embodiment of FIG. 10.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for activity recognition in images generated by a depth camera. The method comprises: receiving, by a processor, a sequence of depth image frames, the frames comprising a plurality of pixels; segmenting, by the processor, each of the frames into a plurality of windows; generating, by the processor, a plurality of spatio-temporal image cells, the image cells comprising a grouping of the windows from a selected sub-sequence of the frames; calculating, by the processor, a four dimensional (4D) optical flow vector for each of the pixels of each of the image cells; calculating, by the processor, a three dimensional (3D) angular representation of each of the optical flow vectors; generating, by the processor, a classification feature for each of the image cells based on a histogram of the 3D angular representations; and executing, by the processor, a recognition classifier to recognize an activity based on the classification features.

Example 2 includes the subject matter of Example 1, further comprising detecting a subject of interest in each of the frames and cropping the frame about the subject of interest.

Example 3 includes the subject matter of Examples 1 or 2, further comprising spatially aligning each of the cropped frames relative to another of the cropped frames.

Example 4 includes the subject matter of any of Examples 1-3, wherein the calculation of the 4D optical flow vector further comprises: calculating a two dimensional (2D) optical flow vector based on a combined local-global energy minimization function applied to the pixels of the image cell; adding a third dimension to the 2D optical flow vector based on a calculated difference between corresponding pixels in consecutive frames; and adding a fourth dimension to the 2D optical flow vector, the fourth dimension comprising a pre-determined scalar value.

Example 5 includes the subject matter of any of Examples 1-4, wherein the generation of the classification features further comprises: associating a histogram with each dimension of the 3D angular representation, the histogram comprising bins corresponding to each of a plurality of angular ranges; incrementing each of the bins based on the magnitude of each pixel in the image cell associated with the bin; normalizing the histograms; and concatenating the histograms to generate the classification feature.

Example 6 includes the subject matter of any of Examples 1-5, wherein the number of histogram bins is in the range of 5 to 9 bins.

Example 7 includes the subject matter of any of Examples 1-6, wherein the recognition classifier is a Support Vector Machine (SVM) classifier.

Example 8 includes the subject matter of any of Examples 1-7, further comprising training the recognition classifier, the training comprising: receiving a sequence of training depth image frames corresponding to a known activity; generating the classification feature for each of the image cells of the training frames; and providing the classification features and a label associated with the known activity to the recognition classifier for training.

Example 9 is a system for recognition of activity in images generated by a depth camera. The system comprises: a cell generation circuit to: receive a sequence of depth image frames, the frames comprising a plurality of pixels; segment each of the frames into a plurality of windows; and generate a plurality of spatio-temporal image cells, the image cells comprising a grouping of the windows from a selected sub-sequence of the frames; an optical flow calculation circuit to calculate a four dimensional (4D) optical flow vector for each of the pixels of each of the image cells; an angle calculation circuit to calculate a three dimensional (3D) angular representation of each of the optical flow vectors; a cell feature calculation circuit to generate a classification feature for each of the image cells based on a histogram of the 3D angular representations; and a recognition classifier circuit to recognize an activity based on the classification features.

Example 10 includes the subject matter of Example 9, further comprising crop and align circuit to detect a subject of interest in each of the frames and crop the frame about the subject of interest.

Example 11 includes the subject matter of Examples 9 or 10, wherein the crop and align circuit is further to spatially align each of the cropped frames relative to another of the cropped frames.

Example 12 includes the subject matter of any of Examples 9-11, wherein the optical flow calculation circuit further comprises: a 2D optical flow calculation circuit to calculate a two dimensional (2D) optical flow vector based on a combined local-global energy minimization function applied to the pixels of the image cell; and a 3D/4D optical flow calculation circuit to add a third dimension to the 2D optical flow vector based on a calculated difference between corresponding pixels in consecutive frames and to add a fourth dimension to the 2D optical flow vector, the fourth dimension comprising a pre-determined scalar value.

Example 13 includes the subject matter of any of Examples 9-12, wherein the cell feature calculation circuit is further to: associate a histogram with each dimension of the 3D angular representation, the histogram comprising bins corresponding to each of a plurality of angular ranges; increment each of the bins based on the magnitude of each pixel in the image cell associated with the bin; normalize the histograms; and concatenate the histograms to generate the classification feature.

Example 14 includes the subject matter of any of Examples 9-13, wherein the number of histogram bins is in the range of 5 to 9 bins.

Example 15 includes the subject matter of any of Examples 9-14, wherein the recognition classifier circuit is a Support Vector Machine (SVM) classifier.

Example 16 includes the subject matter of any of Examples 9-15, further comprising a classifier training circuit to: receive a sequence of training depth image frames corresponding to a known activity; generate the classification feature for each of the image cells of the training frames; and provide the classification features and a label associated with the known activity to the recognition classifier for training.

Example 17 is at least one non-transitory computer readable storage medium having instructions encoded thereon that, when executed by one or more processors, result in the following operations for activity recognition in images generated by a depth camera. The operations comprise: receiving a sequence of depth image frames, the frames comprising a plurality of pixels; segmenting each of the frames into a plurality of windows; generating a plurality of spatio-temporal image cells, the image cells comprising a grouping of the windows from a selected sub-sequence of the frames; calculating a four dimensional (4D) optical flow vector for each of the pixels of each of the image cells; calculating a three dimensional (3D) angular representation of each of the optical flow vectors; generating a classification feature for each of the image cells based on a histogram of the 3D angular representations; and executing a recognition classifier to recognize an activity based on the classification features.

Example 18 includes the subject matter of Example 17, the operations further comprising detecting a subject of interest in each of the frames and cropping the frame about the subject of interest.

Example 19 includes the subject matter of Examples 17 or 18, the operations further comprising spatially aligning each of the cropped frames relative to another of the cropped frames.

Example 20 includes the subject matter of any of Examples 17-19, wherein the calculation of the 4D optical flow vector further comprises the operations of: calculating a two dimensional (2D) optical flow vector based on a combined local-global energy minimization function applied to the pixels of the image cell; adding a third dimension to the 2D optical flow vector based on a calculated difference between corresponding pixels in consecutive frames; and adding a fourth dimension to the 2D optical flow vector, the fourth dimension comprising a pre-determined scalar value.

Example 21 includes the subject matter of any of Examples 17-20, wherein the generation of the classification features further comprises the operations of: associating a histogram with each dimension of the 3D angular representation, the histogram comprising bins corresponding to each of a plurality of angular ranges; incrementing each of the bins based on the magnitude of each pixel in the image cell associated with the bin; normalizing the histograms; and concatenating the histograms to generate the classification feature.

Example 22 includes the subject matter of any of Examples 17-21, wherein the number of histogram bins is in the range of 5 to 9 bins.

Example 23 includes the subject matter of any of Examples 17-22, wherein the recognition classifier is a Support Vector Machine (SVM) classifier.

Example 24 includes the subject matter of any of Examples 17-23, the operations further comprising training the recognition classifier, the training comprising: receiving a sequence of training depth image frames corresponding to a known activity; generating the classification feature for each of the image cells of the training frames; and providing the classification features and a label associated with the known activity to the recognition classifier for training.

Example 25 is a system for activity recognition in images generated by a depth camera. The system comprises: means for receiving a sequence of depth image frames, the frames comprising a plurality of pixels; means for segmenting each of the frames into a plurality of windows; means for generating a plurality of spatio-temporal image cells, the image cells comprising a grouping of the windows from a selected sub-sequence of the frames; means for calculating a four dimensional (4D) optical flow vector for each of the pixels of each of the image cells; means for calculating a three dimensional (3D) angular representation of each of the optical flow vectors; means for generating a classification feature for each of the image cells based on a histogram of the 3D angular representations; and means for executing a recognition classifier to recognize an activity based on the classification features.

Example 26 includes the subject matter of Example 25, further comprising means for detecting a subject of interest in each of the frames and cropping the frame about the subject of interest.

Example 27 includes the subject matter of Examples 25 or 26, further comprising means for spatially aligning each of the cropped frames relative to another of the cropped frames.

Example 28 includes the subject matter of any of Examples 25-27, wherein the calculation of the 4D optical flow vector further comprises: means for calculating a two dimensional (2D) optical flow vector based on a combined local-global energy minimization function applied to the pixels of the image cell; means for adding a third dimension to the 2D optical flow vector based on a calculated difference between corresponding pixels in consecutive frames; and means for adding a fourth dimension to the 2D optical flow vector, the fourth dimension comprising a pre-determined scalar value.

Example 29 includes the subject matter of any of Examples 25-28, wherein the generation of the classification features further comprises: means for associating a histogram with each dimension of the 3D angular representation, the histogram comprising bins corresponding to each of a plurality of angular ranges; means for incrementing each of the bins based on the magnitude of each pixel in the image cell associated with the bin; means for normalizing the histograms; and means for concatenating the histograms to generate the classification feature.

Example 30 includes the subject matter of any of Examples 25-29, wherein the number of histogram bins is in the range of 5 to 9 bins.

Example 31 includes the subject matter of any of Examples 25-30, wherein the recognition classifier is a Support Vector Machine (SVM) classifier.

Example 32 includes the subject matter of any of Examples 25-31, further comprising training the recognition classifier, the training comprising: means for receiving a sequence of training depth image frames corresponding to a known activity; means for generating the classification feature for each of the image cells of the training frames; and means for providing the classification features and a label associated with the known activity to the recognition classifier for training.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for activity recognition in images generated by a depth camera, the method comprising:
   receiving, by a processor, a sequence of depth image frames, the frames comprising a plurality of pixels;
   segmenting, by the processor, each of the frames into a plurality of windows;
   generating, by the processor, a plurality of spatio-temporal image cells, the image cells comprising a grouping of the windows from a selected sub-sequence of the frames;
   calculating, by the processor, a four dimensional (4D) optical flow vector for each of the pixels of each of the image cells;
   calculating, by the processor, a three dimensional (3D) angular representation of each of the optical flow vectors;
   generating, by the processor, a classification feature for each of the image cells based on histograms of the 3D angular representations; and
   executing, by the processor, a recognition classifier to recognize an activity based on the classification features.

2. The method of claim 1, further comprising at least one of:
   detecting a subject of interest in each of the frames and cropping the frame about the subject of interest; and
   spatially aligning each of the cropped frames relative to another of the cropped frames.

3. The method of claim 1, wherein calculating the 4D optical flow vector comprises:
   calculating a two dimensional (2D) optical flow vector based on a combined local-global energy minimization function applied to the pixels of the image cell;
   adding a third dimension to the 2D optical flow vector based on a calculated difference between corresponding pixels in consecutive frames; and
   adding a fourth dimension to the 2D optical flow vector, the fourth dimension comprising a pre-determined scalar value.

4. The method of claim 1, wherein generating the classification features comprises:
   associating the histograms with each dimension of the 3D angular representation, the histograms comprising bins corresponding to each of a plurality of angular ranges;
   incrementing each of the bins based on the magnitude of each pixel in the image cell associated with the bin;
   normalizing the histograms; and
   concatenating the histograms to generate the classification feature.

5. The method of claim 1, wherein the recognition classifier is a Support Vector Machine (SVM) classifier, the method further comprising training the recognition classifier, the training comprising:
   receiving a sequence of training depth image frames corresponding to a known activity;

generating the classification feature for each of the image cells of the training frames; and providing the classification features and a label associated with the known activity to the recognition classifier for training.

6. A system for recognition of activity in images generated by a depth camera, the system comprising:
  a cell generation circuit to:
    receive a sequence of depth image frames, the frames comprising a plurality of pixels;
    segment each of the frames into a plurality of windows; and
    generate a plurality of spatio-temporal image cells, the image cells comprising a grouping of the windows from a selected sub-sequence of the frames;
  an optical flow calculation circuit to calculate a four dimensional (4D) optical flow vector for each of the pixels of each of the image cells;
  an angle calculation circuit to calculate a three dimensional (3D) angular representation of each of the optical flow vectors;
  a cell feature calculation circuit to generate a classification feature for each of the image cells based on histograms of the 3D angular representations; and
  a recognition classifier circuit to recognize an activity based on the classification features, wherein the recognition classifier circuit is a Support Vector Machine (SVM) classifier.

7. The system of claim 6, further comprising a crop and align circuit to detect a subject of interest in each of the frames and crop the frame about the subject of interest.

8. The system of claim 7, wherein the crop and align circuit is further to spatially align each of the cropped frames relative to another of the cropped frames.

9. The system of claim 6, wherein the optical flow calculation circuit comprises:
  a 2D optical flow calculation circuit to calculate a two dimensional (2D) optical flow vector based on a combined local-global energy minimization function applied to the pixels of the image cell; and
  a 3D/4D optical flow calculation circuit to add a third dimension to the 2D optical flow vector based on a calculated difference between corresponding pixels in consecutive frames and to add a fourth dimension to the 2D optical flow vector, the fourth dimension comprising a pre-determined scalar value.

10. The system of claim 6, wherein the cell feature calculation circuit is further to:
  associate the histograms with each dimension of the 3D angular representation, the histograms comprising bins corresponding to each of a plurality of angular ranges;
  increment each of the bins based on the magnitude of each pixel in the image cell associated with the bin;
  normalize the histograms; and
  concatenate the histograms to generate the classification feature.

11. The system of claim 10, wherein the number of histogram bins is in the range of 5 to 9 bins.

12. The system of claim 6, further comprising a classifier training circuit to:
  receive a sequence of training depth image frames corresponding to a known activity;
  generate the classification feature for each of the image cells of the training frames; and
  provide the classification features and a label associated with the known activity to the recognition classifier for training.

13. A computer program product including at least one non-transitory computer readable storage medium having instructions encoded thereon that, when executed by one or more processors cause a process to be carried out for activity recognition in images generated by a depth camera, the process comprising:
  receiving a sequence of depth image frames, the frames comprising a plurality of pixels;
  segmenting each of the frames into a plurality of windows;
  generating a plurality of spatio-temporal image cells, the image cells comprising a grouping of the windows from a selected sub-sequence of the frames;
  calculating a four dimensional (4D) optical flow vector for each of at least one or more of the pixels of each of the image cells;
  calculating a three dimensional (3D) angular representation of each of the optical flow vectors;
  generating a classification feature for each of the image cells based on histograms of the 3D angular representations; and
  executing a recognition classifier to recognize an activity based on the classification features.

14. The computer program product of claim 13, the process further comprising detecting a subject of interest in each of the frames and cropping the frame about the subject of interest.

15. The computer program product of claim 14, the process further comprising spatially aligning each of the cropped frames relative to another of the cropped frames.

16. The computer program product of claim 13, wherein calculating the 4D optical flow vector comprises:
  calculating a two dimensional (2D) optical flow vector based on a combined local-global energy minimization function applied to the pixels of the image cell;
  adding a third dimension to the 2D optical flow vector based on a calculated difference between corresponding pixels in consecutive frames; and
  adding a fourth dimension to the 2D optical flow vector, the fourth dimension comprising a pre-determined scalar value.

17. The computer program product of claim 13, wherein generating the classification features comprises:
  associating the histograms with each dimension of the 3D angular representation, the histograms comprising bins corresponding to each of a plurality of angular ranges;
  incrementing each of the bins based on the magnitude of each pixel in the image cell associated with the bin;
  normalizing the histograms; and
  concatenating the histograms to generate the classification feature.

18. The computer program product of claim 17, wherein the number of histogram bins is in the range of 5 to 9 bins.

19. The computer program product of claim 13, wherein the recognition classifier is a Support Vector Machine (SVM) classifier.

20. The computer program product of claim 13, the process further comprising training the recognition classifier, the training comprising:
  receiving a sequence of training depth image frames corresponding to a known activity;
  generating the classification feature for each of the image cells of the training frames; and
  providing the classification features and a label associated with the known activity to the recognition classifier for training.

* * * * *